United States Patent [19]
King

[11] 3,734,056
[45] May 22, 1973

[54] INFRARED SPECTROSCOPY APPARATUS

[75] Inventor: Stanley T. King, Midland, Mich.

[73] Assignee: The Dow Chemical Company, Midland, Mich.

[22] Filed: Nov. 3, 1970

[21] Appl. No.: 195,439

[52] U.S. Cl............118/48, 118/69, 250/83.3 H, 356/38
[51] Int. Cl...........................................C23c 13/12
[58] Field of Search............118/48–49.5, 5, 69, 9; 117/106–107.2; 148/1 NQ; 356/37, 38; 250/83.3 H, 43.5 R

[56] References Cited

UNITED STATES PATENTS

| | | |
|---|---|---|
| 2,847,319 | 8/1958 | Marvin............................118/49 X |
| 3,055,775 | 9/1962 | Crittenden, Jr. et al............118/49 X |
| 3,462,609 | 8/1969 | Beattie............................356/37 UX |
| 3,526,460 | 9/1970 | Webb............................118/9 X |

Primary Examiner—Morris Kaplan
Attorney—William M. Yates and Earl D. Ayers

[57] ABSTRACT

This invention relates to apparatus for use in isolating monomers of hydrogen-bonded organic compounds, liquids or solids at room temperature in a low temperature inert gas matrix. The apparatus comprises a refrigerated section having an infrared window, a second refrigerated section for pre-cooling the inert matrix gas and for receiving vaporized material to be deposited on the infrared window, the second section having matrix gas nozzles adjacent to a resistance heated sample inserting nozzle entering the second section from an adjacent sample heating and valving section. The nozzle is coupled to a sealed sample container which is inserted in an electrically heated furnace disposed within the second section.

6 Claims, 4 Drawing Figures

INFRARED SPECTROSCOPY APPARATUS

BACKGROUND OF THE INVENTION

This invention relates to apparatus for use in infrared spectroscopy and particularly to a matrix isolation device for use in studying hydrogen-bonded, high-boiling organic compounds by infrared spectroscopy. Low temperature matrix isolation techniques have been used by infrared spectroscopists for more than ten years in the study of low-boiling compounds, unstable molecular species and very high-boiling inorganic compounds. However, little information can be found in the literature about the matrix isolation of the strongly hydrogen-bonded solid organic compounds for analytical studies.

It is well-known to spectroscopists that molecules with OH or NH groups are usually intermolecularly bonded in the liquid or solid phases and the O—H or N—H stretching absorption band is broad in the infrared spectrum. It is difficult to interpret this broad band into useful chemical information. On the other hand, the unassociated OH group shows a sharp absorption in the region 3800–3500 $cm^{-1}$ and the unassociated NH group shows a sharp absorption in the region 3600–3200 $cm^{-1}$ and the frequency at which this band absorbs enables specific identification of the particular group present in the molecule. Infrared spectra of unassociated species of molecules containing the NH or OH group can be obtained in dilute solution, but the molecule must be soluble in a suitable solvent which does not mask the $\nu_{NH}$ or $\nu_{OH}$ absorption bands or other bands. Moreover, many compounds are not soluble in a suitable solvent, and the spectra of their unassociated species cannot be studied in this manner.

Thermal disassociation of hydrogen-bonding in the gas phase is another way to obtain the infrared spectrum of the monomeric species, but for solid sample with very low vapor pressure, a good vapor spectrum is very difficult to obtain. In addition, the overlapping of the broad bands in gas phase spectrum makes it difficult to distinguish them. The spectrum of the monomeric species isolated in low temperature matrix can avoid all the problems discussed above.

Generally, the unassociated species, which can be obtained either by thermal dissociation or by dilution in gas phase, are frozen in a large amount of inert gas matrix on a cold window surface (at 6° or 20° K.) is impractical for a solid sample with negligible vapor pressure at room temperature. Therefore, thermal dissociation has to be used in this case. Usually the hot, unassociated sample in the vapor phase is deposited on the cold window separately with the pre-cooled matrix gas through two different nozzles. Otherwise, the deposition of the pre-mixed hot sample with a large amount of hot matrix gas will cause an instantaneous temperature increase on the cold window surface and poor results of the isolation may be obtained.

Accordingly, a principal object of this invention is to provide an improved device for use in isolating monomers of hydrogen-bonded organic compounds, liquids or solids at room temperature in a low temperature inert gas matrix.

Another object of this invention is to provide an improved, faster operating and easier to use device for use in isolating monomers of hydrogen-bonded organic compounds, liquids, or solids at room temperature in a low temperature inert gas matrix.

In accordance with this invention there is provided matrix isolation apparatus comprising a refrigerated section which includes a rotatable so called infrared window on which the material to be analyzed is deposited, a section for pre-cooling the matrix gas and having nozzles located on each side of a sample thin walled nozzle which is inserted into that section from an adjacent sample valving and heating section. The sample nozzle functions as a resistance heating element to prevent cooling of the sample before it leaves the nozzle, preventing settling of the sample material on the nozzle wall. The nozzle is coupled to an enclosed sample capsule which is inserted within a heating oven in the pre-cooling section.

The invention, as well as additional objects and advantages thereof, will best be understood when the following detailed description is read in connection with the accompanying drawing, in which.

Figure 1:
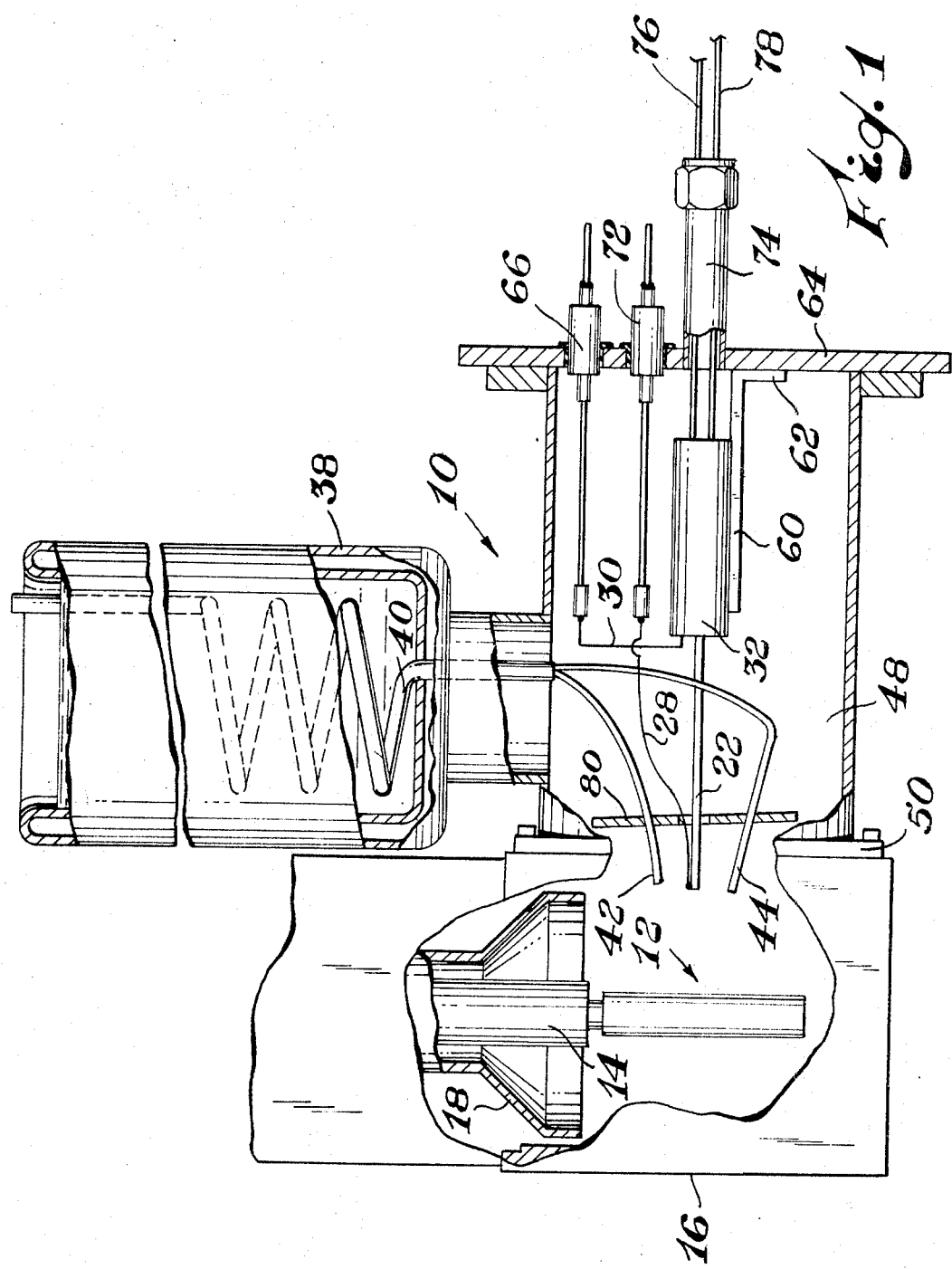
FIG. 1 is a diagrammatical view, partly broken away and in section, of apparatus in accordance with the invention.

Referring to the drawing, and particularly to FIG. 1, there is shown matrix isolation apparatus, indicated generally by the numeral 10. The apparatus 10 comprises a first refrigerated compartment 16 having dispersed therein a heat-exchanger 14 containing liquid hydrogen, liquid helium, or both. A so-called infrared window 12, composed of a crystal of sodium chloride, potassium bromide of cesium iodide, for example, in a metal (copper, for example) frame is mechanically and thermally coupled to the lower end part of the heat exchanger 14. A radiation shielding structure 18 surrounds the heat exchanger.

A second section, comprising a compartment 48 having a vacuum container such as a Dewar container 38 coupled to it, is coupled to the compartment 16 near the lower end thereof by means of a mounting flange 50.

The container 38 contains liquid nitrogen and a coil 40 through which the matrix gas (argon, for example) pre-cooled by the liquid nitrogen, is to be introduced to the chamber 48 through nozzles 42, 44 which are coupled to the lower part of the coil 40.

Figure 2:
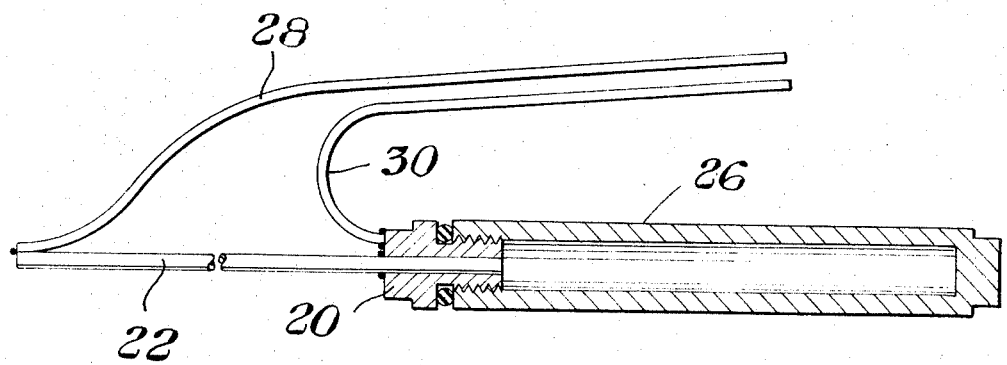
FIG. 2 is an enlarged view of the sample holder and nozzle of the apparatus of FIG. 1.
Figure 3:
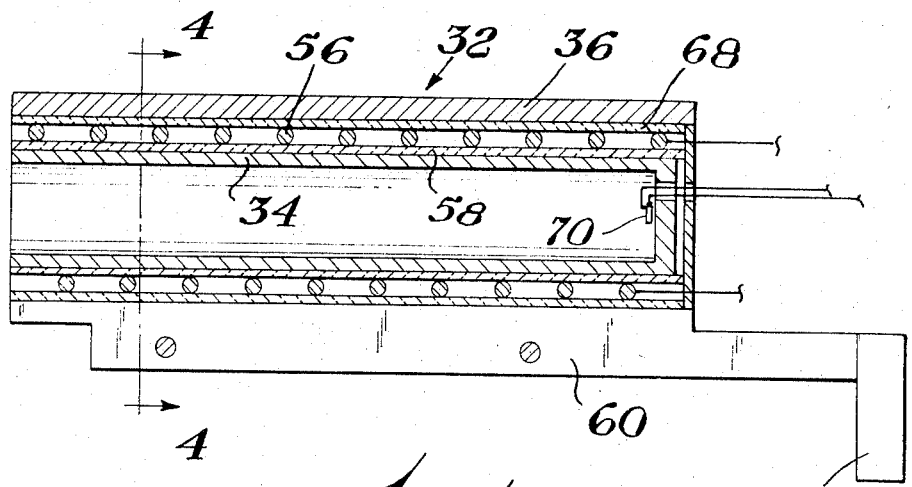
FIG. 3 is an enlarged side elevational view, in section, of the sample cell heating oven.
Figure 4:
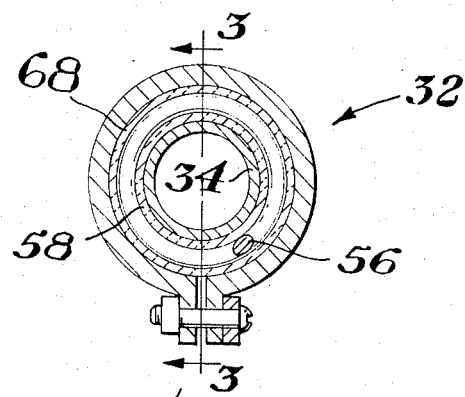
FIG. 4 is a sectional view taken along the line 4—4 of FIG. 3.

Referring to FIGS. 2, 3 and 4, as well as to FIG. 1, a sample input nozzle, indicated generally by the numeral 22, is coupled and sealed to the end of a bushing 20 which closes the open end of the tubular sample container 26. The container 26 is generally of U-shaped longitudinal cross sectional configuration.

The nozzle 22 has electrical leads (usually nichrome wires) 28, 30 coupled to its outer end and to the bushing 20, respectively, as by silver soldering. The sample cell heating oven 32 is an elongated member having internal and external cup-like wall and end parts 32, 34 respectively. A heating coil 56, disposed between the internal and external walls, is separated from the metal walls by sheets 58, 68 of insulating material such as mica, for example.

A thermocouple 70 is disposed in the oven 32 near the bottom of the inner wall structure, its leads extending through the closed end of the oven. The oven 32 is supported by a bracket 60 which is rigidly secured at its flanged end 62 to closure plate 64 which is sealed to the outer end of compartment 48. Feed through elements 66, 72 couple the electrical leads 30, 28, respectively, through the plate 64. Closure tube 74, coupled to the plate 64, permits air-tight feed through of the thermocouple and heater leads 76, 78, respectively. The seal between the plate 64 and the end of the compartment 48 may be made by O-rings or any suitable means.

In operation, the sample material is inserted in the sample holder 26 bushing 20 sealed at the open end of the holder. The holder 26 is then inserted in the oven with the closed end of the holder touching or almost touching the thermocouple 70. The plate 64 is then sealed to the outer end of compartment 48 and compartments 16 and 48 are evacuated. The oven is then heated to vaporize the sample in the holder at a controlled rate.

The nozzle 22 is maintained at a higher temperature (60°–500° C., for example) by passing electric current through it than the temperature in the oven 32 so as to ensure disassociation of the hydrogen bond molecules and also to prevent any deposition of the sample on the nozzle 22. It is very important to keep the sampling device free from sample deposition for routine analysis use because otherwise the impurity from the previous sample would obscure the spectrum of a new sample.

The temperature of the window 12 is reduced by the heat exchanger to a temperature of 20° Kelvin operating with liquid hydrogen or to 6° Kelvin operating with hydrogen and helium gases.

The sample vapor and matrix gas from the nozzles 42, 44 are directed to the window 12 where the sample material is frozen in the matrix gas. The window 12 is then rotated 90° so the window may be aligned with respect to the infrared beam in the spectrometer (not shown) and the spectrum recorded.

After the deposition is finished and the spectrum is recorded, the leads 28, 30 are de-energized, the heater in the oven 32 is turned off to cool it, and the plate 64 removed from the compartment 48. The sample holder 26 and nozzle 22, after uncoupling the electrical leads 28, 30, may then be removed and another sample holder and nozzle assembly inserted in the oven. The electrical leads 28, 30 are then re-connected and the plate 64 is ready to be re-sealed to the compartment 48 and the apparatus may be evacuated.

In the apparatus shown a gold O-ring is used to provide a gas tight seal between the bushing 20 and the body of the sample holder 26. Normally a Viton O-ring seal is provided between the plate 64 and the compartment 28. The inner and outer wall structure of the oven 32 are made of stainless steel, as is the nozzle tube 22.

The electrical leads 28, 30 are usually nichrome and sized to be heated to about the same temperature as the temperature of the nozzle 22 when current is applied thereto.

A brass plate 80, disposed adjacent to the entry into the compartment 12, with the nozzles 22, 42 and 44 extended through or past its sections, provides a baffle to minimize heat transfer from the sample holder and oven into the compartment 12.

Excellent results were obtained when urea, acetamide, cyanamide, chlorinated 2 pyridinols and 3,4-dichloro-2,6-dimethyl-4-pyridinol were used as sample materials.

The apparatus of the invention is helpful also from an operational standpoint because sample holders and nozzles may be easily cleaned and reinserted in the heating assembly. Further, the nozzle may be heated over a wide temperature range since no insulated coil winding is present in the nozzle.

What is claimed is:

1. In analytical apparatus comprising an evacuated chamber having a heat exchanger therein which has an infrared window physically and thermally coupled thereto, a means for directing a pre-cooled matrix gas towards said window, means for heating a sample to be analyzed, and means including a walled nozzle extending into said chamber for directing heated sample to be analyzed towards said window, the improvement comprising providing a sealed sample holder adapted to be inserted into said means for heating the sample to be analyzed, said sample holder having said nozzle coupled thereto, the nozzle having thin walls which function as an electrical heater, and means for electrically energizing said nozzle across the ends thereof.

2. Apparatus in accordance with claim 1, wherein said nozzle is a thin walled stainless steel tube.

3. Apparatus in accordance with claim 1, wherein said means for heating said sample is a temperature controllable resistance heating oven disposed within said evacuated chamber.

4. Apparatus in accordance with claim 2, wherein said sample holder is a tubular element having an open end and a closed end, said open end being closed with a cap having said nozzle sealed thereto, said holder being adapted to fit closely but slidably in said means for heating.

5. Apparatus in accordance with claim 1, wherein heat baffle means are provided between said means for heating and the end of said nozzle.

6. Apparatus in accordance with claim 5, wherein said baffle means is a plate-like structure which is cooled by said pre-cooled matrix gas and by conduction to a heat sink.

* * * * *

UNITED STATES PATENT OFFICE
CERTIFICATE OF CORRECTION

Patent No. 3,734,056      Dated May 22, 1973

Inventor(s) Stanley T. King

It is certified that error appears in the above-identified patent and that said Letters Patent are hereby corrected as shown below:

Column 4, line 11, delete "3,4-" and insert -- 3,5- --.

Signed and sealed this 12th day of February 1974.

(SEAL)
Attest:

EDWARD M. FLETCHER, JR.      C. MARSHALL DANN
Attesting Officer      Commissioner of Patents